Figure 1:
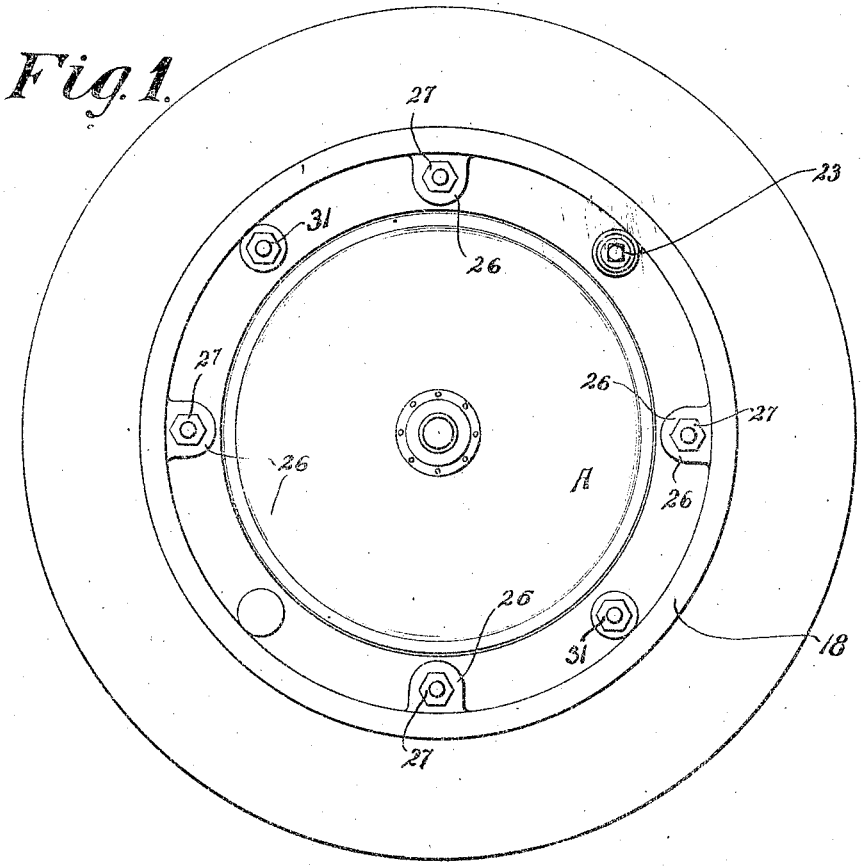

Dec. 9, 1924. 1,518,457

C. SCHERGENS

RIM

Filed Nov. 11, 1922    2 Sheets-Sheet 1

Charles Schergens.
INVENTOR

BY Victor J. Evans.
ATTORNEY

WITNESS:

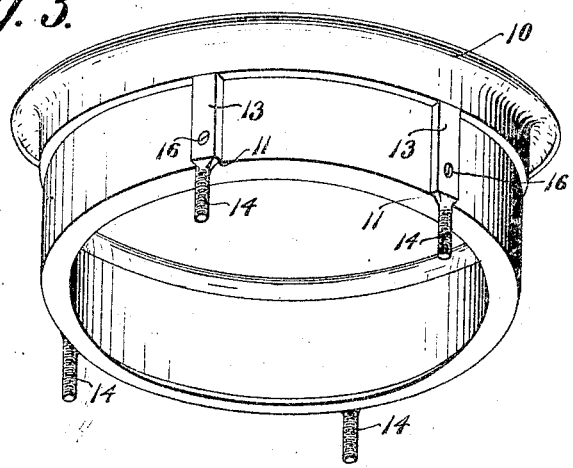
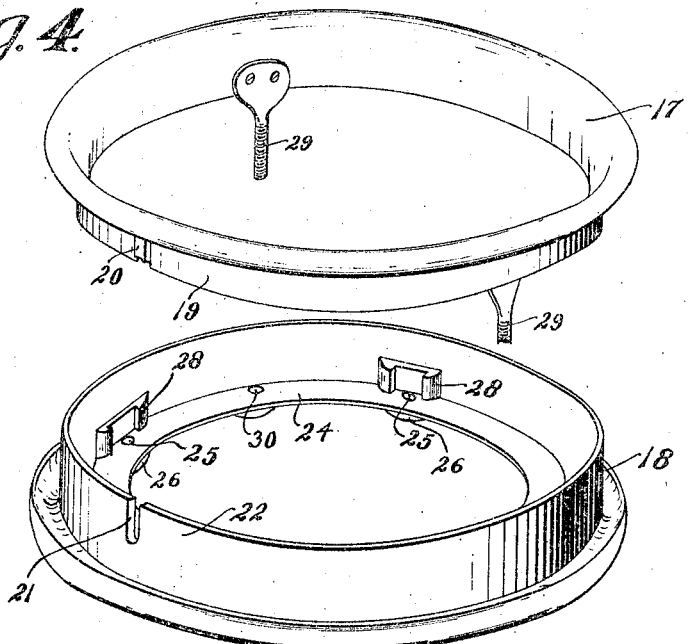

Patented Dec. 9, 1924.

1,518,457

UNITED STATES PATENT OFFICE.

CHARLES SCHERGENS, OF ST. LOUIS, MISSOURI.

RIM.

Application filed November 11, 1922. Serial No. 600,318.

*To all whom it may concern:*

Be it known that I, CHARLES SCHERGENS, a citizen of the United States, residing at St. Louis, in the county of St. Louis and State of Missouri, have invented new and useful Improvements in Rims, of which the following is a specification.

This invention relates to demountable tire carrying rims, and has for its chief object, the provision of a rim which is so constructed as to permit the application of a tire thereto, or its removal therefrom without stretching the tire in any way whatsoever, and without the use of tools generally used for this purpose.

More specifically stated, the invention provides a tire carrying rim made up of inner and outer sections associated in a manner which permit the sections to be easily separated for the association with or the removal therefrom of the tire, and said sections when connected together being capable of being readily placed upon the felly of the wheel and conveniently secured thereto.

The nature and advantages of the invention will be readily understood when the following detailed description is read in connection with the accompanying drawings, the invention residing in the construction, combination and arrangement of parts as claimed.

Figure 2:
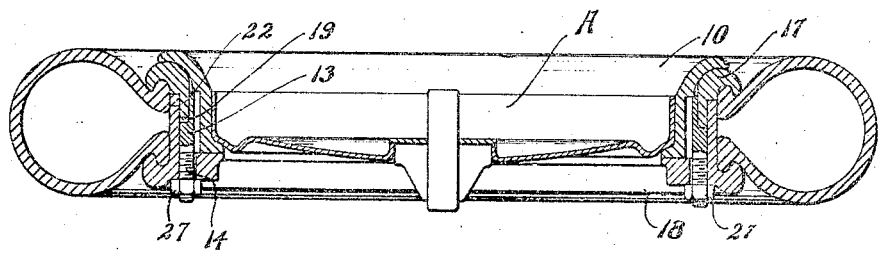

In the drawings forming part of this application, like numerals of reference indicate similar parts in the several views, and wherein:

Figure 1 is an elevation of a demountable rim constructed in accordance with my invention, and having a pneumatic tire associated therewith. Figure 2 is a transverse sectional view of the same. Figure 3 is a perspective of one of the rim sections and Figures 4 and 5 are perspectives of coacting rim sections used in conjunction with the rim section disclosed in Figure 3.

Referring to the drawings in detail, A indicates a vehicle wheel provided with the usual felly band or false rim 10, which is secured to the felly of the wheel in any suitable manner. This rim is provided with depressions 11 which accommodate the plates 13 from which the threaded extensions 14 project. The body of each plate 13 is fitted in one of said depressions 11. Each plate is secured to the felly band 10 by a fastening element 16. Manifestly the threaded extensions 14 project beyond one side of the band and are utilized to hold the demountable rim positioned upon the wheel in a manner to be hereinafter described.

The rim proper includes an inner section 17 and an outer section 18, and neither of these sections is split as is the usual tire carrying rim. The outer section is slightly larger in diameter to slip over the inner section, and the peripheral flange of the outer section is also slightly wider than is the corresponding flange of the inner section. The latter mentioned flange of the inner section is indicated at 19 and carries a lug 20 which is received by a slot 21 in a peripheral flange 22 of the outer section, the lug serving to hold the valve stem 23 properly positioned in the slot. The outer section is further formed with an annular flange 24 which is arranged at a right angle to the peripheral flange 22 and the flange 24 is provided with a plurality of diametrically opposed openings 25 to receive the threaded extensions 14 which project from the fellyband 10. The outer side of this flange 24 is further formed with lugs 26, which form an integral part of the flange, and take the place of the rim lugs now in use, which are separable from the rim. Manifestly there is one of these lugs 26 for each extension 14, and each lug is provided with an opening which coincides with the adjacent opening 25 above referred to.

When the rim in its entirety is positioned upon the wheel, the extensions 14 of the felly band project through the openings and lugs are then associated with nuts 27, which bear against said lugs and hold the rim in position upon the wheel. The inner surface of the peripheral flange 22 is provided with guides 28 to accommodate the plates 13 which are associated with the felly band or rim 10, and each guide extends beyond the opposite sides of one of the openings 25, and is substantially of U-shape formation in cross section. By reason of these guides the association of the rim sections is materially facilitated.

Carried by the inner section 17 of the rim and arranged at diametrically opposed points, is a pair of threaded bolts or the like 29 which are adapted to pass through the openings 30 formed in the flange 24 of the outer rim section, these bolts being equipped with nuts 31 to hold the rim sections fixed relatively when associated. These are the only two points at which the rim sections are connected, so that when it is desired to change a tire, it is only necessary to remove the bolts 31 subsquent, of course, to the separation of the rim from the wheel, whereupon the rim sections can be separated for the purpose mentioned. The tire is first arranged above the outer section 18, and then the inner section is slipped within the outer section in a manner which permits the tire to be mounted upon the rim, without either stretching the tire or necessitating the use of the tire rim tools of well known construction. After the sections have been associated, the rim together with the tire can be easily slipped upon the wheel, the extensions 14 thereof passing through the openings 25 above referred to.

While it is believed that from the foregoing description, the nature and advantages of the invention will be readily apparent, I desire to have it understood that I do not limit myself to what is herein shown and described and that such changes may be resorted to when desired as fall within the scope of what is claimed.

Having thus described the invention, I claim:

In combination with a felly, a plurality of elongated plates secured to the periphery of the felly and terminating in laterally extending threaded shanks, a rim receivable on the felly and having an annular flange having a plurality of openings, a plurality of plates carried by the inner face of the rim and each of which being arranged in transverse alinement with one of the openings, and having recesses adapted to accommodate the elongated plates, the threaded shanks passing through said openings, and nuts threaded upon the shanks and bearing against the flange.

In testimony whereof I affix my signature.

CHARLES SCHERGENS.